H. Sargent,
Truss.
N° 55,369.    Patented June 5, 1866.
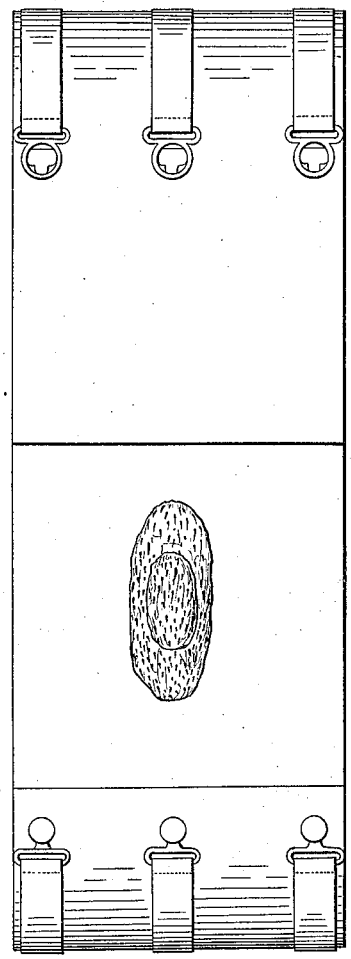
Witnesses.
Inventor
Howard Sargent.

UNITED STATES PATENT OFFICE.

HOWARD SARGENT, OF BOSTON, MASSACHUSETTS.

IMPROVEMENT IN TRUSSES.

Specification forming part of Letters Patent No. 55,369, dated June 5, 1866.

*To all whom it may concern:*

Be it known that I, HOWARD SARGENT, of Boston, in the county of Suffolk and State of Massachusetts, have invented a new and useful Improvement in Trusses for Umbilical Hernia; and I do hereby declare that the following full, clear, and exact description of the construction and operation of the same, reference being had to the accompanying drawing, forming a part of this specification, is sufficient to enable others skilled in the art to which this invention most nearly belongs to make and use the same without other experiment or invention.

The defects of the ordinary truss for umbilical hernia, with its hard round boss and steel spring, are sought to be obviated in my improvement, which consists in the use of a pad of improved shape made of sponge.

A is a pad of sponge, about two inches long and one inch wide, upon which is raised an oblong boss about one inch long and half an inch wide, designed to fit the umbilicus, and shaped similarly to that depression. It is fastened in place by a broad elastic girdle, B, confined about the waist by straps and clasps C or other suitable device.

The pad may be attached to said girdle, or may be applied to the umbilicus and the girdle clasped around it to keep it in position. The latter is, perhaps, the better way, as it allows one pad to be substituted for another when the one first applied becomes soiled by exudations or discharges.

The advantage of this pad is that, being made with a boss of the shape and size of the umbilicus, there is less danger of slipping, and consequently of strangulated hernia.

The size of the boss will, of course, be varied according to the size of the umbilicus, but the medium or average trade-size would be as above stated. I do not, however, confine myself to these dimensions of boss.

The advantage of sponge is that it is soft and elastic, absorbs exudations and discharges, and is easily cleaned.

The broad elastic girdle gives support to the bowels in all directions, confines the pad without possibility of slipping, and is every way superior to the common steel spring.

By use of slides instead of clasps the girdle can be adjusted to a waist of any size.

The whole truss costs about one-third the price of the ordinary kind, and is much more effective.

What I claim as my invention, and desire to secure by Letters Patent, is—

A pad, A, as described, made of sponge, for the purpose set forth.

HOWARD SARGENT.

Witnesses:
H. FLOYD FAULKNER,
THOS. WM. CLARKE.